(12) United States Patent
Goy et al.

(10) Patent No.: US 11,713,716 B2
(45) Date of Patent: Aug. 1, 2023

(54) GEAR AND BEARING INDENTS TO INDUCE FLUID FILM

(71) Applicant: Hamilton Sundstrand Corporation, Charlotte, NC (US)

(72) Inventors: Edward W. Goy, Crystal Lake, IL (US); Weishun William Ni, Rockton, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/403,046

(22) Filed: Aug. 16, 2021

(65) Prior Publication Data
US 2023/0048163 A1    Feb. 16, 2023

(51) Int. Cl.
*F02C 7/22* (2006.01)
*F04C 2/06* (2006.01)

(52) U.S. Cl.
CPC .................. *F02C 7/22* (2013.01); *F04C 2/06* (2013.01); *F05D 2220/32* (2013.01)

(58) Field of Classification Search
CPC ........... F02C 7/22; F04C 2/06; F05D 2220/32
See application file for complete search history.

(56) References Cited

U.S. PATENT DOCUMENTS

| 3,632,240 A | 1/1972 | Dworak |
| 4,105,267 A * | 8/1978 | Mori ..................... F16C 33/046 384/291 |
| 5,941,532 A | 8/1999 | Flaherty et al. |
| 6,095,690 A * | 8/2000 | Niegel .................. F16C 33/103 384/293 |
| 8,708,567 B2 * | 4/2014 | Lee ...................... F16C 33/1065 384/293 |
| 10,060,430 B2 | 8/2018 | Ishii et al. |
| 2008/0100001 A1 | 5/2008 | Flaherty |
| 2008/0273825 A1 * | 11/2008 | Morales Espejel ..... F16C 17/02 384/549 |
| 2014/0255234 A1 | 9/2014 | Schumann |
| 2017/0175736 A1 * | 6/2017 | Craig .................... F01C 21/108 |
| 2019/0101117 A1 | 4/2019 | Ikeda et al. |

(Continued)

FOREIGN PATENT DOCUMENTS

| EP | 1918617 A1 | 5/2008 |
| EP | 2295802 A2 | 3/2011 |
| JP | H1150974 A | 2/1999 |

OTHER PUBLICATIONS

V. Brizmer, et al., "A Laser Surface Textured Parallel Thrust Bearing", from Tribology Transactions vol. 46 (Jul. 2003), pp. 397-403.

(Continued)

*Primary Examiner* — J. Todd Newton
(74) *Attorney, Agent, or Firm* — Kinney & Lange, P.A.

(57) ABSTRACT

A fuel pump assembly for a gas turbine engine includes a shaft for transmitting motion, a gear connected to and coaxial with the shaft with the gear having a first wear surface, a first bearing coaxial with the shaft with the first bearing being configured to support the gear and having a second wear surface positioned to interact with the first wear surface, and a plurality of indents. The indents are distributed in the first wear surface or the second wear surface and at least two of the plurality of indents are partially aligned in a radial direction.

17 Claims, 5 Drawing Sheets

(56) References Cited

U.S. PATENT DOCUMENTS

| | | |
|---|---|---|
| 2020/0224722 A1 | 7/2020 | Imura et al. |
| 2020/0224768 A1 | 7/2020 | Imura et al. |
| 2020/0332901 A1 | 10/2020 | Imura |
| 2022/0196013 A1* | 6/2022 | Goy .................. F04C 2/084 |

OTHER PUBLICATIONS

Extended European Search Report for EP Application No. 22187336.7, dated Jan. 3, 2023, 8 pages.

* cited by examiner

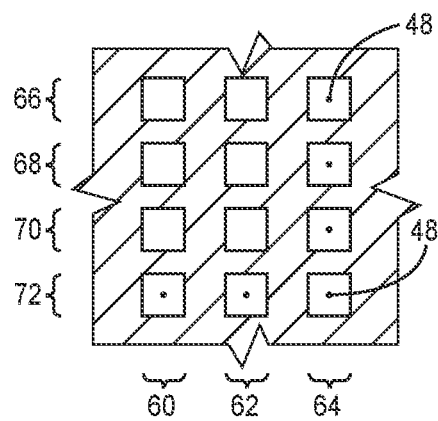
FIG. 5A
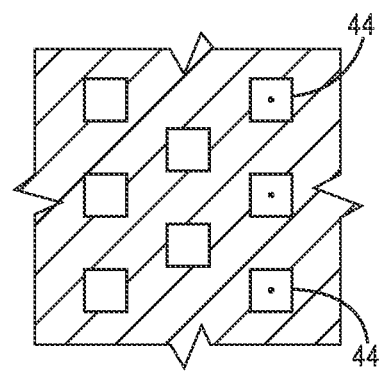
FIG. 5B
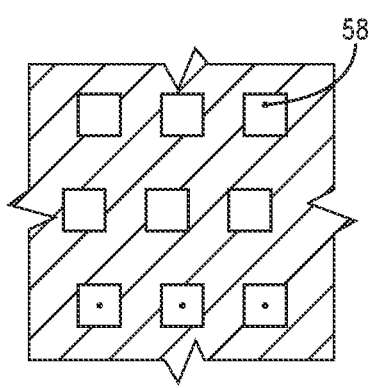
FIG. 5C
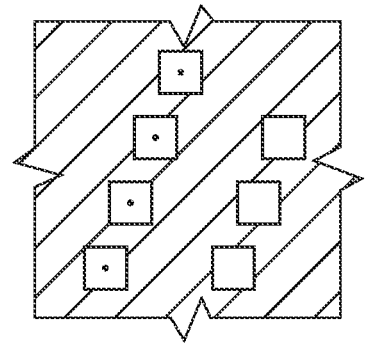
FIG. 5D
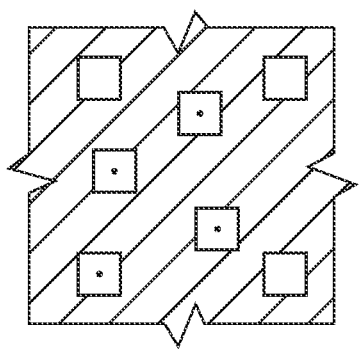
FIG. 5E
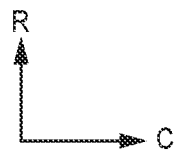

GEAR AND BEARING INDENTS TO INDUCE FLUID FILM

FIELD OF THE INVENTION

The present invention relates to gears and bearings in a gear pump and, in particular, to indents on a surface of the gear or bearing to control a fluid film thickness between the two components.

BACKGROUND

Stationary or floating bearings are used to support gears in a gear pump. Wear damage on the surface of the gear or bearing can result from contact between the gear and the bearing. These surfaces can mechanically wear over time and are sensitive to friction or contact. Mechanical efficiency, pump operating life, operating pressures, and speeds are all limited by preventing gear and bearing wear and the materials usable for the gear and bearing. Accordingly, there remains a need to reduce friction and prevent metal-to-metal contact by controlling a fluid film thickness between the gear and bearing during operation.

SUMMARY

A fuel pump assembly for a gas turbine engine includes a shaft for transmitting rotational motion, a gear connected to and coaxial with the shaft with the gear having a first wear surface, a first bearing coaxial with the shaft with the first bearing being configured to support the gear and having a second wear surface positioned to interact with the first wear surface, and a plurality of indents. The indents are distributed in the first wear surface or the second wear surface and at least two of the plurality of indents are partially aligned in a radial direction or circumferential direction.

An assembly includes a shaft for transmitting rotational motion, a gear connected to and coaxial with the shaft with the gear having a first wear surface, a first bearing coaxial with the shaft with the first bearing being configured to support the gear and having a second wear surface that interacts with the first wear surface, and a plurality of indents. A total surface area of all of the indents occupies between 15 percent and 25 percent of a total surface area on the first wear surface or the second wear surface.

A method of operating a pair of gear and bearing assemblies includes rotating a gear adjacent a bearing configured to support the gear with the gear having a first wear surface positioned to interact with a second wear surface of the bearing. One of the first wear surface and the second wear surface includes a plurality of indents with at least two of the plurality of indents being partially aligned in a radial or circumferential direction. The method further includes generating a fluid film thickness with a fluid between the first wear surface and the second wear surface, wherein during said gear rotation the plurality of indents creates a separation force with local vortex hydrodynamic pressure on the fluid to produce the fluid film thickness.

BRIEF DESCRIPTION OF THE DRAWINGS

FIGS. 5A, 5B, 5C, 5D, and 5E are plan views of the bearing having various indent configurations.

Figure 1:
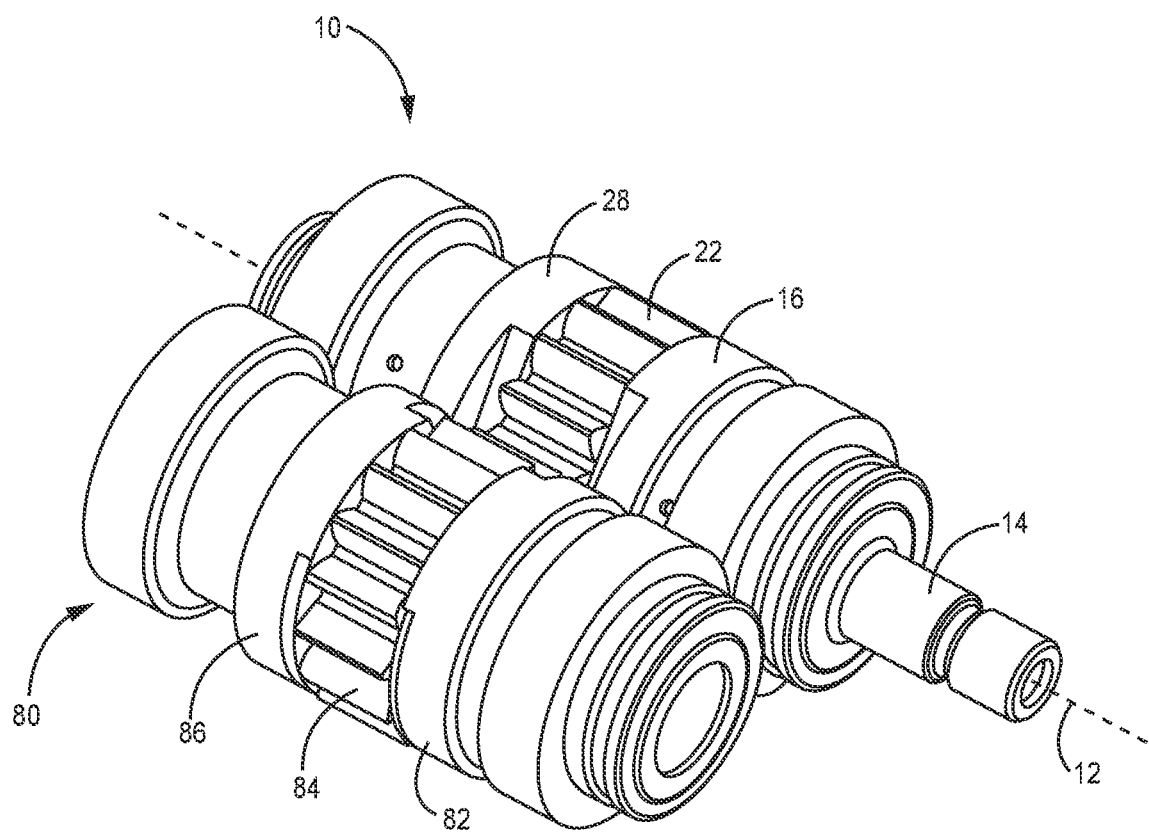
FIG. 1 is a perspective view of a gear set supported by bearings.

While the above-identified figures set forth one or more embodiments of the present disclosure, other embodiments are also contemplated, as noted in the discussion. In all cases, this disclosure presents embodiments by way of representation and not limitation. It should be understood that numerous other modifications and embodiments can be devised by those skilled in the art, which fall within the scope and spirit of the principles of the disclosure. The figures may not be drawn to scale, and applications and embodiments of the present disclosure may include features and components not specifically shown in the drawings.

DETAILED DESCRIPTION

Gear pumps utilize gears to transfer fluids through the gear pump from an inlet to an outlet. The circumferential rotation of the gears deliver the fluid from the inlet to the outlet through each gear tooth. Gear pumps typically utilize two gears that have meshing teeth and are well suited for pumping low and high viscosity fluids. The gears in gear pumps are supported by bearings for handling axial load.

A gear and bearing assembly for a gear pump is disclosed herein that includes a drive shaft, a gear set, and bearings. The drive gear is connected to and coaxial with the shaft. The shaft transmits rotational motion to the gear and the gear rotates about the same axis as the shaft. The bearings support the gear and handle axial loads during shaft rotation. The gear or bearings have a plurality of indents in a wear surface to create a fluid film thickness with a fluid between the gear and bearing. The indents create a separation force on the fluid film, causing turbulent fluid flow between the gear and bearing. This separation force generates an appropriate fluid film thickness for tribology lubrication that assists in counteracting the axial load pushing the gear and bearing closer to each other. The fluid film thickness reduces or prevents solid surface contact between the gear and bearing and acts as a lubricant.

FIG. 1 shows a perspective view of first gear and bearing assembly 10 and second gear and bearing assembly 80, which can be a portion of a gear pump that includes two gears along two separate shafts with the two gears having teeth that mesh with each other to pump the fluid. First gear and bearing assembly 10 includes axial centerline 12, shaft 14, first bearing 16, first gear 22, and second bearing 28. Shaft 14 extends along axial centerline 12. First gear 22 is connected to and coaxial with shaft 14. First bearing 16 is coaxial with shaft 14 and is on one axial side of first gear 22. First bearing 16 is configured to support first gear 22. Second bearing 28 is coaxial with shaft 14 and is on an opposite axial side of first gear 22 from first bearing 16. Second bearing 28 is configured to support first gear 22. First bearing 16, first gear 22, and second bearing 28 are arranged sequentially along axial centerline 12. First gear and bearing assembly 10 can include other components not expressly shown in FIG. 1. For example, first gear and bearing assembly 10 can include a housing or casing, seal, inlet port, outlet port, and safety valve. First gear and bearing assembly 10 can be a portion of an internal gear pump assembly or an external gear pump assembly. First gear and bearing assembly 10 can include a different number of gears or bearings from what is shown in FIG. 1.

Second gear and bearing assembly 80 can be similar in components and configuration to first gear and bearing assembly 10 and can mirror first gear and bearing assembly 10. Second gear and bearing assembly 80 includes third bearing 82, second gear 84, and fourth bearing 86. Second gear 84 is connected to and coaxial with a second shaft (not shown). Third bearing 82 is coaxial with the second shaft and is on one axial side of second gear 84. Third bearing 82 is configured to support second gear 84. Fourth bearing 86 is coaxial with the second shaft and is on an opposite axial side of second gear 84 from third bearing 82. Fourth bearing 86 is configured to support second gear 84. Third bearing 82, second gear 84, and fourth bearing 86 can be arranged sequentially along a separate axial centerline than axial centerline 12. Second gear and bearing assembly 80 can include other components not expressly shown in FIG. 1. For example, second gear and bearing assembly 80 can include a housing or casing, seal, inlet port, outlet port, and safety valve. Second gear and bearing assembly 80 can be a portion of an internal gear pump assembly or an external gear pump assembly. Second gear and bearing assembly 80 can include a different number of gears or bearings from what is shown in FIG. 1 and can be oriented differently with respect to first gear and bearing assembly 10.

Second gear and bearing assembly 80 can have similar features, components, characteristics, and/or configurations to that of first gear and bearing assembly 10. For example, second gear and bearing assembly 80 can include gaps, indents, and wear surfaces like first gear and bearing assembly 10. Third bearing 82 and fourth bearing 86 can have wear surfaces like first wear surface 24 and second wear surface 18 with indents similar to indents 44. Second gear and bearing assembly 80 can have a fluid film thickness to prevent metal-to-metal or surface contact like that of first gear and bearing assembly 10.

During operation, shaft 14 rotates about axial centerline 12 and transmits rotational motion to first gear 22. First bearing 16 and second bearing 28 support first gear 22 directly by handling axial loads (i.e., by preventing substantial axial movement of first gear 22) and indirectly by handling radial loads (i.e., by preventing radial movement of shaft 14). Fluid is pumped with first gear and bearing assembly 10 when first gear 22 is rotated. First gear and bearing assembly 10 increases the pressure of the fluid (i.e., pumps the fluid). First bearing 16 and second bearing 28 are configured to support the axial loads imparted on first bearing 16 and second bearing 28 by first gear 22 during rotation. First bearing 16 and second bearing 28 can be stationary or floating bearings such that bearings 16 and 28 are stationary relative to shaft 14 and first gear 22, rotate at a slower or faster speed relative to shaft 14 and first gear 22, or rotate in an opposite direction relative to shaft 14 and first gear 22. Shaft 14 can be a drive shaft and first gear 22 can be a drive gear. For example, shaft 14 can transmit rotational motion to first gear 22 causing second gear 84 to rotate. First gear 22 and second gear 84 have teeth that mesh causing first gear 22 and second gear 84 to rotate together to pump a fluid. In another example, second gear and bearing assembly 80 can have a drift shaft and a drive gear. For example, second gear 84 could be a drive gear causing first gear 22 to rotate. Third bearing 82 and fourth bearing 86 are configured to support the axial loads imparted on third bearing 82 and fourth bearing 86 by second gear 84 during rotation. Third bearing 82 and fourth bearing 86 can be stationary relative to second gear 84, rotate at a slower or faster speed relative to second gear 84, or rotate in an opposite direction relative to second gear 84.

Figure 2:
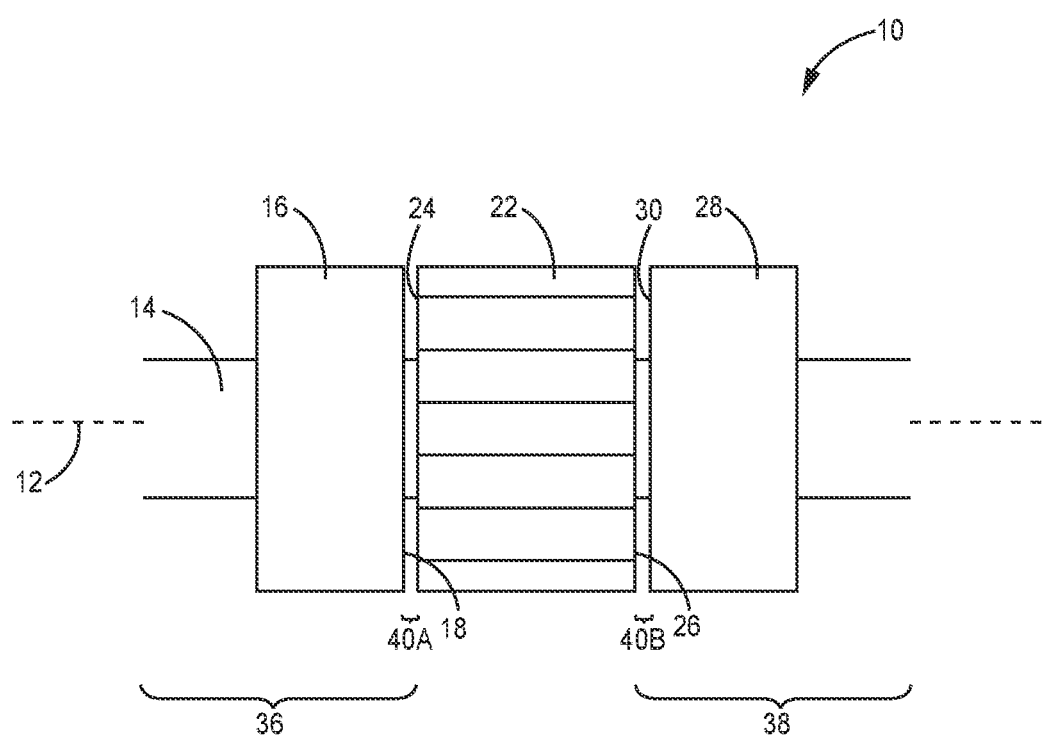
FIG. 2 is a side view of a gear and bearing assembly with a gap for fluid film.

FIG. 2 shows a side view of first gear and bearing assembly 10 and includes axial centerline 12, shaft 14, first bearing 16, second wear surface 18, first gear 22, first wear surface 24, third wear surface 26, second bearing 28, fourth wear surface 30, first axial side 36, second axial side 38, gap 40A, and gap 40B.

Shaft 14 extends along axial centerline 12. In one example, shaft 14 can have a circular cross-sectional shape or can be other cross-sectional shapes, such as rectangle, triangle, pentagon, or hexagon. Shaft 14 can be within a gas turbine engine and can be a main shaft, a secondary shaft, or another component for transmitting rotational energy. Shaft 14 can transmit motion to other components and can rotate about axial centerline 12. Shaft 14 can be made from a variety of different materials.

First gear 22 is connected to and coaxial with shaft 14 and contains first wear surface 24 on first axial side 36 and third wear surface 26 on second axial side 38. First gear 22 can be annular in shape with teeth extending radially outward along the entire circumference of first gear 22. First gear 22 can be made of various materials. In one example, first gear 22 is made of a single material. In another example, first gear 22 is made of multiple materials or pieces fastened together. First gear 22 can be built with shaft 14 as a single piece or can be two separate pieces welded, attached, or otherwise fastened together. First wear surface 24 and third wear surface 26 can be the same material as first gear 22 or different materials from first gear 22 and fastened to first gear 22. First wear surface 24 and third wear surface 26 can be two different materials. In one example, first gear 22 has teeth for meshing with another gear to pump a fluid through a gear pump. First wear surface 24 and third wear surface 26 can be on any portion of the axial ends of first gear 22, including the radially outermost portion of the axial ends of first gear 22 that include teeth.

First bearing 16 is coaxial with shaft 14 and is on first axial side 36 of first gear 22. First axial side 36 includes a portion of shaft 14, first bearing 16, first wear surface 24, second wear surface 18, and gap 40A. In one example, first bearing 16 has an annular shape. In another example, first bearing 16 can be stationary or floating. First bearing 16 supports first gear 22. First bearing 16 allows first gear 22 to rotate for pumping fluid and ensures first gear 22 does not move too much in the axial direction. First bearing 16 can also indirectly support first gear 22 in the radial direction. Second wear surface 18 is on first bearing 16 and is positioned to interact with first wear surface 24 on first gear 22. First bearing 16 can be made from a variety of different materials. First bearing 16 can be the same or different material as second wear surface 18. If second wear surface 18 is a different material, first bearing 16 can be attached to second wear surface 18. Indents 44 (as shown in FIGS. 3A-3E, 4A-4F, and 5A-5E) are distributed in first wear surface 24 or second wear surface 18. Indents 44 can be on any portion of first wear surface 24 or second wear surface 18, including the portion of teeth on first wear surface 24 of first gear 22.

Gap 40A is positioned between first wear surface 24 and second wear surface 18. Gap 40A is a gap between first wear surface 24 and second wear surface 18 for the fluid film to enter and/or flow. The size of gap 40A (distance between first wear surface 24 and second wear surface 18) can vary depending on, but not limited to, fluid type, first gear 22 rotation speed, environmental conditions, thermal energy, separation forces, friction, and fluid film interaction with indents 44. In one example, the fluid film can consist of a fuel. In another example, the fluid film can consist of jet fuel.

As discussed below, indents 44 on either first wear surface 24 or second wear surface 18 create turbulent flow of the fluid therebetween, which causes a separation force to push first wear surface 24 away from second wear surface 18 to control/increase gap 40A.

Second bearing 28 is coaxial with shaft 14 and is on second axial side 38 of first gear 22. Second bearing 28 can be similar to first bearing 16, but second bearing 28 is on an opposite side of first gear 22. Second axial side 38 includes a portion of shaft 14, second bearing 28, third wear surface 26, fourth wear surface 30, and gap 40B. In one example, second bearing 28 has an annular shape. Second bearing 28 can be stationary or floating. Second bearing 28 allows first gear 22 to rotate and ensures first gear 22 does not move too much in the axial direction. Second bearing 28 can also indirectly support first gear 22 in the radial direction.

Fourth wear surface 30 is on second bearing 28 and is positioned to interact with third wear surface 26 on first gear 22, which is on an opposite side of first wear surface 24 of first gear 22. Second bearing 28 can be made from a variety of different materials. Second bearing 28 can be the same or different material as fourth wear surface 30. If fourth wear surface 30 is a different material, second bearing 28 can be attached to fourth wear surface 30. Indents 44 are distributed in third wear surface 26 or fourth wear surface 30. Indents 44 can be on any portion of the third wear surface 26 or the fourth wear surface 30, including the portion of teeth on third wear surface 26 of first gear 22.

Gap 40B is positioned between third wear surface 26 and fourth wear surface 30. Gap 40B is a gap between the third wear surface 26 and fourth wear surface 30 for the fluid film to enter and/or flow. The size of gap 40B (distance between third wear surface 26 and fourth wear surface 30) can vary depending on, but not limited to, fluid type, first gear 22 rotation speed, environmental conditions, thermal energy, separation forces, friction, and the fluid film interaction with indents 44. As discussed below, indents 44 of either third wear surface 26 and fourth wear surface 30 create turbulent flow of the fluid therebetween, which causes a separation force to push third wear surface 26 away from fourth wear surface 30 to control/increase gap 40B.

During operation, fluid is pumped by first gear and bearing assembly 10 when first gear 22 is rotated. First gear 22 rotation allows fluid to enter gap 40A between first wear surface 24 and second wear surface 18 and gap 40B between third wear surface 26 and fourth wear surface 30. Indents 44 create a separation force on the fluid film to produce a certain fluid film thickness. This separation force during rotation increases the width of gaps 40A and 40B to reduce or prevent contact between first gear 22 and first bearing 16 and first gear 22 and second bearing 28 because the separation force ensures gaps 40A and 40B are sufficiently large enough. While the surfaces are described as "wear surfaces" herein, gaps 40A and 40B can be sufficient to prevent any wear altogether by preventing contact between the wear surfaces. Due to indents 44, fluid film can have a turbulent movement during first gear 22 rotation. The fluid film can support first gear 22 during rotation because of indent 44 separation force. The fluid film generation prevents or reduces contact damage to first gear 22, first bearing 16, and second bearing 28. Thus, less waste heat is created allowing for a variety of different materials to be used that could not previously be used due to temperature limitations.

Indents 44 can reduce rotating friction by improving the fluid film thickness between both first gear 22 and first bearing 16 and first gear 22 and second bearing 28. Indents 44 form a sufficiently thick fluid film to prevent or reduce contact. The fluid between first gear 22 and first bearing 16 and first gear 22 and second bearing 28 has more of a turbulent flow or movement because of indents 44 on the surface of first wear surface 24, second wear surface 18, third wear surface 26 and/or fourth wear surface 30. Gear fuel pump friction reduction will improve pump mechanical efficiency, which translates to extended pump operating life and cavitation erosion reduction. Different first gear and bearing assembly 10 materials could be utilized that have lower coefficients of thermal conductivity and the disclosed first gear and bearing assembly 10 can have an extended operating life as compared to existing gear pumps due to better fluid film generation and less mechanical wear. The disclosed first gear and bearing assembly 10 can be operated at higher pressure and speed conditions as compared to existing gear pumps without inducing first bearing 16 and second bearing 28 face wear. Without indents 44 on the surface of first wear surface 24, second wear surface 18, third wear surface 26 and/or fourth wear surface 30, first gear 22 and first bearing 16 and first gear 22 and second bearing 28 can damage each other with contact.

In one example, first gear and bearing assembly 10 is part of a fuel pump assembly. In another example, first gear and bearing assembly 10 is part of a fuel pump assembly for a gas turbine engine. Indents 44 can be especially important in making a fluid film thickness to reduce or prevent bearing and/or gear wear for a gas turbine engine due to extreme operating conditions such as high temperatures. When temperature rises, the viscosity of jet fuel drops and makes separation of the gear and bearing more difficult. Indents 44 solve this problem by creating the separation force to maintain or increase the fluid film thickness.

FIGS. 3A-3E are cross-sectional views of various indent 44 shapes. Indents 44 can be distributed in first wear surface 24, second wear surface 18, third wear surface 26, and fourth wear surface 30.

Figure 3A:
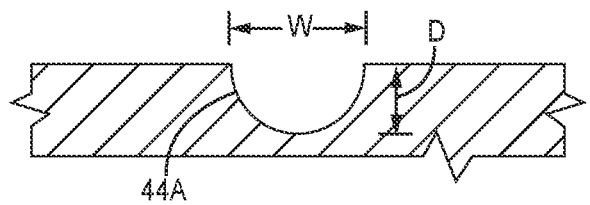
FIGS. 3A, 3B, 3C, 3D, and 3E are cross-sectional views of various indent shapes in the gear and bearing assembly.

FIG. 3A shows a cross-sectional view of indent 44A with a cylindrical indent shape with a depth "D" and width at the surface "W." For example, indent 44A depth can be the same distance as the width at the surface (such as a semi-circle). Indent 44A depth can also be longer or shorter than the width at the surface.

Figure 3B:
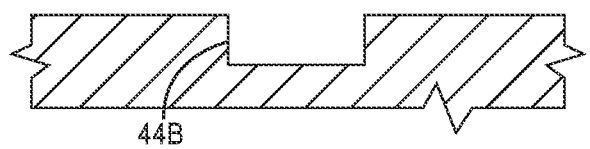

FIG. 3B shows a cross-sectional view of indent 44B with a rectangular indent shape. For example, indent 44B depth can be the same distance as the width at the surface (such as a square). Indent 44B depth can also be longer or shorter than the width at the surface for a deeper or shallower indent 44B, respectively (such as a rectangle).

Figure 3C:
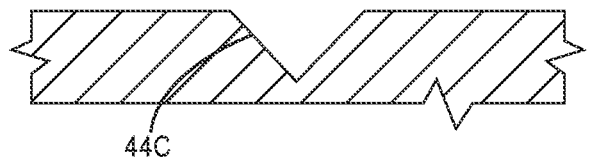

FIG. 3C shows a cross-sectional view of indent 44C with a triangular indent shape. For example, the triangular shape could be that of an equilateral triangle, isosceles triangle, or scalene triangle. The depth of indent 44C can be the same, shorter, or longer than the width at the surface.

Figure 3D:
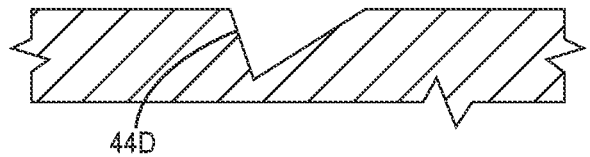

FIG. 3D shows a cross-sectional view of indent 44D with a wedge indent shape. Indent 44D can have various angles with a steeper wall and a flatter wall. The steeper wall or flatter wall can be on the first side in the direction of fluid flow. The depth of indent 44D can be the same, shorter, or longer than the width at the surface.

Figure 3E:
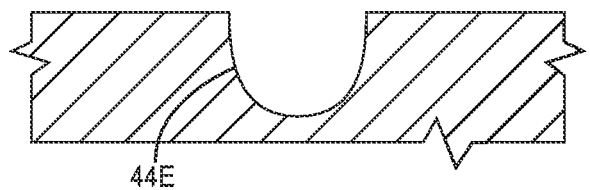

FIG. 3E shows a cross-sectional view of indent 44E with a semi-ellipse indent shape. The depth of indent 44E can be the same, shorter, or longer than the width at the surface. FIGS. 3A-3E are non-limiting examples of cross-sectional views of indent 44 shapes. Any side or wall of indents 44A-44E can be rotated towards the direction of fluid flow.

In one example, each of the indents 44 has a depth that the indents 44 extend into the first wear surface 24, second wear surface 18, third wear surface 26 or fourth wear surface 30. The ratio of surface area of one of the indents 44 to the depth of one of the indents 44 in this example is 0.012. Other examples can include indents 44 with the ratio of an absolute value of a surface area to an absolute value of a depth of between approximately 0.01 and 0.05.

In one example, the depth of each indent 44 can range from 1 micrometer to 10 micrometers. In another example, the depth of each indent 44 is approximately 2.54 micrometers.

During first gear 22 rotation, indents 44 create a separation force on the fluid film to produce a certain fluid film thickness. Different indent 44 cross-sectional shapes (44A-44E) create different fluid film thicknesses depending on gear rotation speed because the separation force applied to the fluid is different depending on indent 44 cross-sectional shapes (44A-44E). The fluid interacts differently with various cross-sectional shapes because of the edges or curves of the cross-sectional shapes and because different amounts of fluid can interact with the shape. Various cross-sectional shapes of indents 44 may be chosen based off operating conditions or desired fluid film thickness. For example, the hydrodynamic lifting forces can change based on indent 44 cross-sectional shapes (44A-44E). Multiple different indent 44 cross-sectional shapes can be on the same wear surface. The cross-sectional shapes (44A-44E) are shown as non-limiting examples of possible indent 44 cross-sectional shapes.

Indents 44 creating a sufficiently thick fluid film thickness allows for use of other first gear and bearing assembly 10 materials that may have different properties optimized for cavitation, heat, sliding, operating life, or operating conditions such as pressure or velocity. Higher temperatures and operating speeds may be utilized because less waste heat is created with a sufficiently thick fluid film in first gear and bearing assembly 10. Thus, higher operating temperatures can be maintained because of this fluid film thickness. First gear and bearing assembly 10 surfaces such as first wear surface 24, second wear surface 18, third wear surface 26 and/or fourth wear surface 30 with indents 44 can be made using micro-laser etching or laser ablation. For example, femtosecond laser ablation machines can create indents 44 in first wear surface 24, second wear surface 18, third wear surface 26 and fourth wear surface 30. Laser ablation works well for the depths of indents 44 that are desired. Other surface modification techniques can also be used to create indents 44.

Figure 4A:
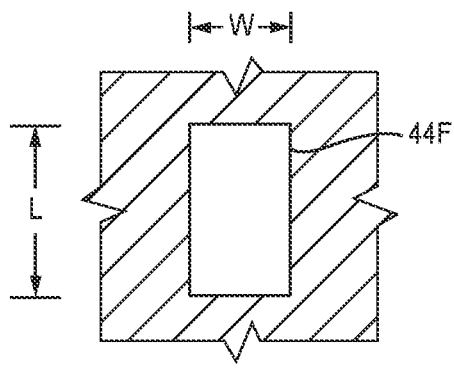
FIGS. 4A, 4B, 4C, 4D, 4E, and 4F are plan views of various indent surface shapes in the gear and bearing assembly.

FIGS. 4A-4F are plan views of various indent 44 surface shapes. A surface shape is the shape of indent 44 when looking straight down on first wear surface 24, second wear surface 18, third wear surface 26 or fourth wear surface 30. FIG. 4A shows a plan view of indent 44F with a rectangle surface shape with side length "L" and width "W." Indent 44F has a length of a side and a width (the distance of the top and bottom). Indent 44F can have equal lengths and widths to be a square. Indent 44F can also be a rectangle with unequal lengths and widths. Any side can be the leading side towards the direction of fluid flow.

Figure 4B:
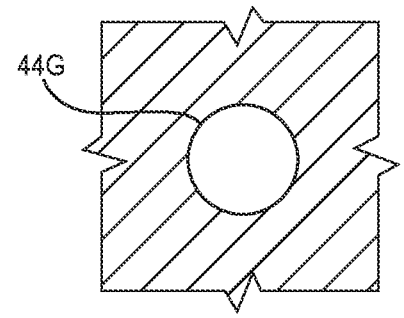

FIG. 4B shows a plan view of indent 44G with a circle surface shape. Indent 44G can have an equal radius at all points. The radius can be changed for various indents 44 so as to have a mixture of different sized indent 44G on a surface.

Figure 4C:
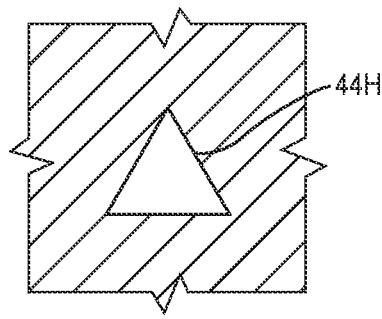

FIG. 4C shows a plan view of indent 44H with a triangle surface shape. Indent 44H can be any triangular shape, such as an equilateral triangle, isosceles triangle, or scalene triangle. Any side can be the leading side towards fluid flow. In another example, one of the points of the triangle could be pointed towards the direction of fluid flow.

Figure 4D:
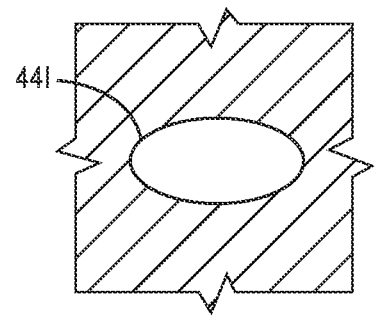

FIG. 4D shows a plan view of indent 44I with an ellipse surface shape. Indent 44I can have a longer and shorter axis where the longer and shorter axis lengths can vary in length.

Figure 4E:
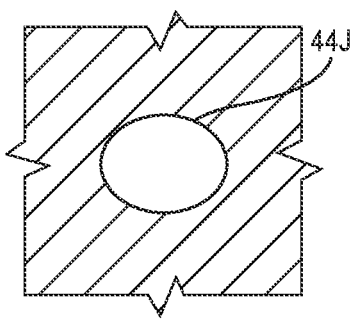

FIG. 4E shows a plan view of indent 44J with an oval surface shape. Indent 44J can be such that the oval surface shape has only one axis of symmetry (egg shaped).

Figure 4F:
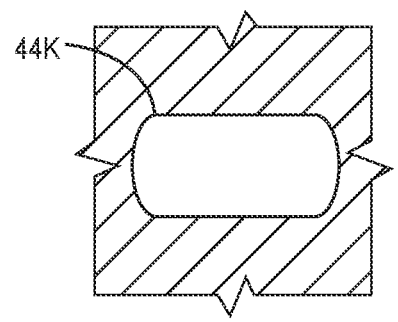

FIG. 4F shows a plan view of indent 44K with a stadium surface shape. Indent 44K straight sides can be shorter or longer. Indent 44K rounded corners can be more or less rounded. Indent 44K can be oriented in any direction and with any side or edge towards fluid flow. FIGS. 4A-4F are non-limiting examples of possible indent 44 surface shapes (44F-44K). Any of indents 44F-44K along with other surface shapes can be rotated in any direction to have any part of the shape facing towards the fluid flow direction.

In one example, the length of indent 44F can be from 1 micrometer to 200 micrometers. In another example, the length of indent 44F can be approximately 50 micrometers. In one example, the width of indent 44F can be 1 micrometer to 200 micrometers. In another example, the width of indent 44F is approximately 15 micrometers. These lengths and widths can be used for any indent 44 surface shapes (44F-44K) or other surface shapes.

These indent 44 surface shapes can be on the surfaces of first wear surface 24, second wear surface 18, third wear surface 26, and fourth wear surface 30. Different indent 44 surface shapes can create different magnitudes of separation force creating a different fluid film thickness. Depending on the application and operating conditions, the surface shape can be changed to create a lesser or greater fluid film thickness. The surface shapes may have different edges or curves on the surface causing different interactions with the fluid. The fluid interaction with indent 44 surface shapes can increase the turbulent movement of the fluid.

FIGS. 5A-5E are plan views of various indent 44 configurations. Indents 44 are shown on a surface, for example, on first wear surface 24, second wear surface 18, third wear surface 26, or fourth wear surface 30. Each indent 44 has a surface shape midpoint 48. The radial direction is shown as "R" and the circumferential direction as "C." Surface shape midpoint 48 is the midpoint of the surface shape of indent 44 in circumferential direction C. Indents 44 also have a surface shape midpoint 58 in the radial direction.

FIG. 5A is a plan view of an indent configuration where surface shape midpoints 48 of indents 44 are aligned in both the radial direction and the circumferential direction. FIG. 5A shows first column 60, second column 62, third column 64, first row 66, second row 68, third row 70, and fourth row 72. Indents 44 are aligned with indents 44 in adjacent columns and rows.

FIG. 5B is a plan view of an indent configuration where surface shape midpoints 48 of indents 44 are aligned in the radial direction. For example, FIG. 5B shows indents 44 with first column 60, second column 62, and third column 64. The indents 44 are offset so there are no rows of indents 44 like that of FIG. 5A.

FIG. 5C is a plan view of an indent configuration where surface shape midpoints 48 of indents 44 are aligned in the circumferential direction. For example, FIG. 5C shows indent 44 with first row 66, second row 68, and third row 70. The indents 44 are offset so there are no columns of indents 44.

FIG. 5D is a plan view of an indent configuration where surface shape midpoints 48 of indents 44 are not aligned in either the radial direction or the circumferential direction but are arranged diagonally when looking in the radial direction.

FIG. 5E is a plan view of an indent configuration where surface shape midpoints 48 of indents 44 are not aligned in either the radial direction or the circumferential direction. FIGS. 5A-5E of various indent 44 configurations are non-limiting examples of indent 44 configurations.

FIGS. 5A-5E show examples of indent configurations that can extend circumferentially around the entirety of the first wear surface 24, second wear surface 18, third wear surface 26, and fourth wear surface 30. Indents 44 can also be distributed in certain circumferential portions of the previously mentioned wear surfaces while other circumferential sections of the wear surfaces may have no indents. In one example, the total surface area of all the indents 44 occupies between 15 percent and 25 percent of a total surface area of the first wear surface 24, second wear surface 18, third wear surface 26 or fourth wear surface 30. This percentage of a total surface area on a wear surface can be advantageous to fully support first gear 22 while creating enough separation to prevent any wear. In another example, the indents 44 have a gap between each other 0.25 degrees in the radial direction.

Indents 44 as shown in FIGS. 5A-5E are shown with indent 44F rectangular surface shape as an example. Indents 44 in FIGS. 5A-5E can have other surface shapes such as 44G-44K. Indents 44 can also have any cross-sectional shape such as indents 44A-44E. In one example of an indent 44, the cross-sectional shape could be that of 44A, the surface shape could be that of 44F, and the orientation on the surface could be that of FIG. 5B. In another example of an indent 44, the cross-sectional shape could be that of 44B, the surface shape could be that of 44F, and the orientation on the surface could be that of FIG. 5D.

Different indent 44 configurations can cause the fluid film thickness to be different depending on the operating conditions. This is due to the different spacing between indents 44 and the way the fluid interacts with indents 44 during rotation of first gear 22. Different separation forces creating different fluid film thicknesses can be advantageous because different operating conditions may require more or less separation force. Indent 44 configurations can change how turbulent the movement of the fluid is between first gear 22 and the first bearing 16 and second bearing 28 and can increase the separation force. The turbulence of the fluid help to maintain the fluid film thickness.

DISCUSSION OF POSSIBLE EMBODIMENTS

The following are non-exclusive descriptions of possible embodiments of the present invention.

A fuel pump assembly for a gas turbine engine, among other possible options, includes a shaft, a gear, a first wear surface, a first bearing, a second wear surface, and a plurality of indents. The shaft transmits motion. The gear is connected to and coaxial with the shaft and the gear has a first wear surface. The first bearing is coaxial with the shaft and the first bearing is configured to support the gear. The first bearing has a second wear surface positioned to interact with the first wear surface. The plurality of indents is distributed in the first wear surface or the second wear surface and at least two of the plurality of indents are partially aligned in a radial direction.

The fuel pump assembly of the preceding paragraph can optionally include, additionally and/or alternatively, any one or more of the following features, configurations and/or additional components.

In the fuel pump assembly, the first bearing can be on a first axial side of the gear. The assembly can comprise a third wear surface on the gear and a second bearing, wherein the third wear surface is on a second axial side of the gear that is opposite the first wear surface. The second bearing is coaxial with the shaft, the second bearing being configured to support the gear, wherein the second bearing has a fourth wear surface positioned to interact with the third wear surface, wherein the indents are distributed in the third wear surface or the fourth wear surface.

A total surface area of all the indents can occupy between 15 percent and 25 percent of a total surface area of the first wear surface or the second wear surface.

At least one of the indents can have a cross-sectional shape selected from the group consisting of a rectangle, triangle, wedge, semicircle, and semi-ellipse.

At least one of the indents can have a surface shape selected from the group consisting of a rectangle, circle, triangle, ellipse, oval, and stadium.

Each of the indents has a surface shape midpoint in a circumferential direction, and the midpoints of at least two of the indents can be aligned in a radial direction.

Each of the indents has a surface shape midpoint in a circumferential direction, and the midpoints of at least two of the indents can be aligned in the circumferential direction.

Each of the indents has a depth that the indents extend into the first wear surface or the second wear surface and a ratio of a surface area of one of the indents to the depth of one of the indents can be between approximately 0.01 and 0.05.

The fuel pump assembly can include a fuel between the first wear surface and the second wear surface when the fuel pump assembly is in operation, wherein the indents control a film thickness of the fuel.

An assembly, among other possible options, includes a shaft, a gear, a first wear surface, a first bearing, a second wear surface, and a plurality of indents. The shaft transmits motion. The gear is connected to and coaxial with the shaft, the gear having a first wear surface. The first bearing is coaxial with the shaft, the first bearing being configured to support the gear, wherein the first bearing has the second wear surface that interacts with the first wear surface. The plurality of indents has a total surface area all of the indents occupies between 15 percent and 25 percent of a total surface area on the first wear surface or the second wear surface.

The assembly of the preceding paragraph can optionally include, additionally and/or alternatively, any one or more of the following features, configurations, and/or additional components.

In the assembly, the first bearing can be on a first axial side of the gear. The assembly can include a third wear surface, a second axial side of the gear, a second bearing, and a fourth wear surface. The third wear surface is on the gear, wherein the third wear surface is on a second axial side of the gear that is opposite the first wear surface. The second bearing is coaxial with the shaft, the second bearing being configured to support the gear, wherein the second bearing has the fourth wear surface positioned to interact with the third wear surface, wherein the indents are distributed in the third wear surface or the fourth wear surface.

At least one of the indents can have a cross-sectional shape selected from the group consisting of a rectangle, triangle, wedge, semicircle, and semi-ellipse.

At least one of the indents can have a surface shape selected from the group consisting of a rectangle, circle, triangle, ellipse, oval, and stadium.

Each of the indents has a depth that the indents extend into the first wear surface or the second wear surface and a ratio of a surface area of one of the indents to the depth of one of the indents can be between approximately 0.01 and 0.05.

A method of operating a gear and bearing assembly, among other possible options, includes rotating a gear adjacent a bearing configured to support the gear, the gear having a first wear surface positioned to interact with a second wear surface of the bearing, wherein one of the first wear surface and the second wear surface includes a plurality of indents with at least two of the plurality of indents being partially aligned in a radial direction. The method also includes generating a fluid film thickness with a fluid between the first wear surface and the second wear surface, wherein during said gear rotation the plurality of indents creates a separation force on the fluid to produce the fluid film thickness.

The method of the preceding paragraph can optionally include, additionally and/or alternatively, any one or more of the following steps, features, configurations, steps, and/or additional components.

The fluid can be a fuel and the method further can include pumping the fuel through the assembly by rotating the gear.

A total surface area of all of the indents can occupy between 15 percent and 25 percent of a total surface area of the first wear surface or the second wear surface.

At least one of the indents can have a cross-sectional shape selected from the group consisting of a rectangle, triangle, wedge, semicircle, and semi-ellipse.

At least one of the indents can have a surface shape selected from the group consisting of a rectangle, circle, triangle, ellipse, oval, and stadium.

Each of the indents has a depth that the indents extend into the first wear surface or the second wear surface and a ratio of a surface area of one of the indents to the depth of one of the indents can be between approximately 0.01 and 0.05.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel pump assembly for a gas turbine engine, the fuel pump assembly comprising:
   a shaft for transmitting motion;
   a gear connected to and coaxial with the shaft, the gear having a first wear surface;
   a first bearing coaxial with the shaft, the first bearing being configured to support the gear, wherein the first bearing has a second wear surface positioned to interact with the first wear surface; and
   a plurality of indents, wherein each of the indents extends a respective depth into the first wear surface or the second wear surface, at least two of the plurality of indents are partially aligned in a radial direction, and a ratio of an absolute value of a surface area of one of the indents to an absolute value of the depth of the indent is between approximately 0.01 and 0.05.

2. The fuel pump assembly of claim 1, wherein the first bearing is on a first axial side of the gear and the fuel pump assembly further comprises:
   a third wear surface on the gear, wherein the third wear surface is on a second axial side of the gear that is opposite the first wear surface; and
   a second bearing coaxial with the shaft, the second bearing being configured to support the gear, wherein the second bearing has a fourth wear surface positioned to interact with the third wear surface, wherein the indents are distributed in the third wear surface or the fourth wear surface.

3. The fuel pump assembly of claim 1, wherein a total surface area of all the indents occupies between 15 percent and 25 percent of a total surface area of the first wear surface or the second wear surface.

4. The fuel pump assembly of claim 1, wherein at least one of the indents has a cross-sectional shape selected from the group consisting of a rectangle, triangle, wedge, semicircle, and semi-ellipse.

5. The fuel pump assembly of claim 1, wherein at least one of the indents has a surface shape selected from the group consisting of a rectangle, circle, triangle, ellipse, oval, and stadium.

6. The fuel pump assembly of claim 1, wherein each of the indents has a surface shape midpoint in a circumferential direction, and the midpoints of at least two of the indents are aligned in a radial direction.

7. The fuel pump assembly of claim 1, wherein each of the indents has a surface shape midpoint in a circumferential direction, and the midpoints of at least two of the indents are aligned in the circumferential direction.

8. The fuel pump assembly of claim 1 further comprising:
   a fuel between the first wear surface and the second wear surface when the fuel pump assembly is in operation, wherein the indents at least partially control a film thickness of the fuel.

9. An assembly comprising:
   a shaft for transmitting motion;
   a gear connected to and coaxial with the shaft, the gear having a first wear surface;
   a first bearing coaxial with the shaft, the first bearing being configured to support the gear, wherein the first bearing has a second wear surface that interacts with the first wear surface; and
   a plurality of indents, wherein a total surface area of all the indents occupies between 15 percent and 25 percent of a total surface area on the first wear surface or the second wear surface, and wherein each of the indents a respective depth into the first wear surface or the second wear surface and a ratio of an absolute value of a surface area of one of the indents to an absolute value of the depth of the indent is between approximately 0.01 and 0.05.

10. The assembly of claim 9, wherein the first bearing is on a first axial side of the gear and further comprises:
    a third wear surface on the gear, wherein the third wear surface is on a second axial side of the gear that is opposite the first wear surface; and
    a second bearing coaxial with the shaft, the second bearing being configured to support the gear, wherein the second bearing has a fourth wear surface positioned to interact with the third wear surface, wherein the indents are distributed in the third wear surface or the fourth wear surface.

11. The assembly of claim 9, wherein at least one of the indents has a cross-sectional shape selected from the group consisting of a rectangle, triangle, wedge, semicircle, and semi-ellipse.

12. The assembly of claim 9, wherein at least one of the indents has a surface shape selected from the group consisting of a rectangle, circle, triangle, ellipse, oval, and stadium.

13. A method of operating a gear and bearing assembly, the method comprising:

rotating a gear adjacent a bearing configured to support the gear, the gear having a first wear surface positioned to interact with a second wear surface of the bearing, wherein one of the first wear surface and the second wear surface includes a plurality of indents with at least two of the plurality of indents being partially aligned in a radial direction and wherein each of the indents extends a respective depth into one of the first wear surface and the second wear surface and a ratio of an absolute value of a surface area of one of the indents to an absolute value of the depth of the indent is between approximately 0.01 and 0.05; and generating a fluid film thickness with a fluid between the first wear surface and the second wear surface, wherein during said gear rotation the plurality of indents creates a separation force on the fluid to produce the fluid film thickness.

14. The method of claim 13, wherein the fluid is a fuel and the method further comprises:

pumping the fuel through the assembly by rotating the gear.

15. The method of claim 13, wherein a total surface area of all the indents occupies between 15 percent and 25 percent of a total surface area of the first wear surface or the second wear surface.

16. The method of claim 13, wherein at least one of the indents has a cross-sectional shape selected from the group consisting of a rectangle, triangle, wedge, semicircle, and semi-ellipse.

17. The method of claim 13, wherein at least one of the indents has a surface shape selected from the group consisting of a rectangle, circle, triangle, ellipse, oval, and stadium.

* * * * *